United States Patent Office 2,840,577
Patented June 24, 1958

2,840,577

17-THIO DERIVATIVES OF ESTRATRIEN-3-OL AND OF ESTRATETRAEN-3-OL

Raymond M. Dodson, Park Ridge, and Paul B. Sollman, Skokie, Ill., assignors to G. D. Searle & Co., Chicago, Ill., a corporation of Delaware No Drawing. Application December 21, 1956
Serial No. 629,787

10 Claims. (Cl. 260—397.5)

The present invention relates to a new class of thiosteroids. It is concerned in part with those derivatives of 1,3,5(10)-estratrien-3-ol and its ethers and esters which are substituted at the 17-position by a substituent containing sulfur in a bivalent state, said substituent being attached to the carbon atom at position 17 by a carbon-sulfur valence bond. It is also concerned with salts and with 16-dehydro derivatives of these compounds. Accordingly, the compounds of this invention include the estratriene derivatives of the structural formula

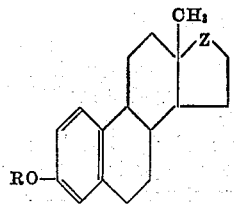

and the estratetraene derivatives of the structural formula

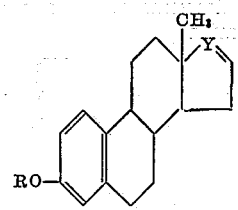

In these formulas R can represent hydrogen, a lower alkyl radical, or an acyl radical of a hydrocarbon carboxylic acid; Z can represent a sulfur-containing group, such as a CS, CHSH, CHS(lower alkyl), CHS(lower alkyl)$_2$ halide, or a CHS-acyl group; and Y can represent a sulfur-containing group such as a CS(lower alkyl) or a CS-acyl group. The lower alkyl groups comprehended within the terms R, Y, and Z can be selected from among methyl, ethyl, propyl, butyl, amyl, hexyl, heptyl, octyl, and branched-chain isomers thereof. Acyl radicals comprehended within the terms R, Y and Z are preferably the acyl radicals of hydrocarbon carboxylic acids having fewer than 9 carbon atoms. Such acyl radicals can be lower alkanoyl radicals, such as formyl, acetyl, propionyl, butyryl, valeryl, hexanoyl, heptanoyl, octanoyl, and branched-chain isomers thereof. Other suitable acyl radicals are those which are cyclic or partially-cyclic in structure. Representative of such acyl radicals are cyclopentanecarbonyl, cyclohexanecarbonyl, cyclopentaneacetyl, cyclopentanepropionyl, cyclohexaneacetyl, benzoyl, methylbenzoyl, phenylacetyl, and homologs and isomers of the foregoing.

This is a continuation-in-part of copending application Serial No. 550,474, filed December 1, 1955, now abandoned.

Compounds of various stereochemical conformations and configurations are included within the scope of this invention and can be represented by partial structural formulas comprising the D ring of the steroid nucleus.

When Z in the foregoing structural representation is a CHSH group, there are embraced thereby the 17β-thiols of the configuration

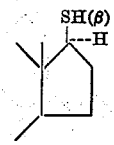

and the 17α-thiols of the configuration

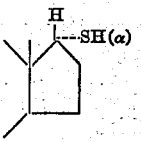

When Z is a CHS(lower alkyl) group, there are included the 17β-thioethers of the configuration

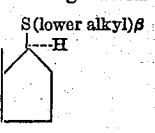

and the 17α-thioethers of the configuration

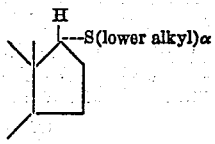

When Z is a CHS-acyl group, there are included the 17β-acylthio derivatives of the configuration

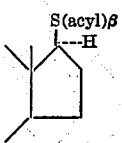

and the 17α-acylthio derivatives of the configuration

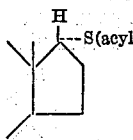

It has been discovered that the 17-thiols, 17-thioethers, 17-thioketones, 17-acylthio derivatives, and the sulfonium salts which constitute this invention can be prepared from readily available and relatively abundant starting materials such as estrone, estradiol, and ethers and esters thereof. For example, esterification of the 17β-hydroxyl group of estradiol 3-monoacetate with p-toluenesulfonyl chloride followed by selective hydrolysis of the ester group at position 3 results in the formation of the 17-p-toluenesulfonate of 1,3,5(10)-estratriene-3,17β-diol. The ester grouping in this compound is of the neopentyl type and by analogy with similar compounds, such as the neopentyl halides, would be expected to be resistant to replacement by another negative group. Surprisingly, when the ester is treated with sodium hydrosulfide, replacement of the ester grouping occurs readily, with the introduction of a thiol group in the α-configuration and the formation of 3-hydroxyl-1,3,5(10)-estratriene-17α-thiol.

The stereoisomeric 3-hydroxy-1,3,5(10)-estratriene-17β-thiol is conveniently obtained from estrone or esters thereof by another method which has been newly developed. In a specific embodiment of this method, the dibenzylmercaptole of estrone acetate is prepared by the acid-catalyzed reaction of estrone acetate and benzyl mercaptan. When this dibenzylmercaptole is treated with metallic sodium in liquid ammonia, the reaction product is the thioketone, 3-hydroxy-1,3,5(10)-estratriene-17-thione of the following structure

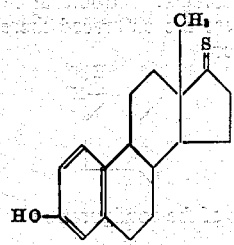

The same thioketone results when the 3-acetoxy group is hydrolyzed by a separate operation prior to the reaction with sodium in ammonia. Reduction of this compound with sodium borohydride yields 3-hydroxy-1,3,5 (10)-estratriene-17β-thiol.

In an alternative method for the manufacture of the thioketones of this invention, estrone or an estrone alkyl ether, suitably dissolved in a hydroxylic solvent, such as a mixture of dioxane and ethanol, is treated with a large excess of hydrogen sulfide and hydrogen chloride. In this process the carbonyl group is converted to the thiocarbonyl group, and the 17-thione is isolated.

By treating the mercaptans described herein with acylating agents, representatively the chlorides or anhydrides of hydrocarbon carboxylic acids, suitably in pyridine solution, thioesters are obtained in which the hydrogen of the free hydroxyl group, if present, and the hydrogen of the thiol group are replaced by acyl radicals. The compounds obtained thereby are of the type

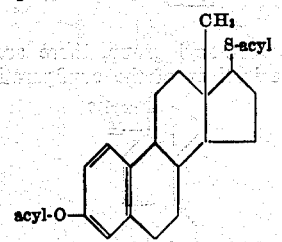

or the corresponding 3-monoether analogs.

Other important compounds of this invention are the thioethers of the structural formula

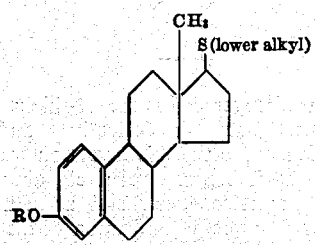

wherein R is defined as hereinbefore. One method of preparing these compounds is by the alkylation of the corresponding 3 - hydroxy - 1,3,5(10) - estratriene - 17-thiol. Suitable reagent mixtures for carrying out the alkylation reactions are mixtures of a lower alkyl iodide, a sodium alcoholate, and a lower aliphatic alcohol. Alkylating agents such as dimethyl sulfate and diethyl sulfate are also suitable. Thioethers having a lower alkylthio group in both the α- and β-configuration at position 17 can be prepared by alkylating the corresponding mercaptan of the same configuration. Selective alkylation reactions can be achieved by regulating the quantities of reagents and the reaction conditions. For example, the reaction of 3-hydroxy-1,3,5(10)-estratriene-17β-thiol with a restricted amount of methyl iodide in the presence of sodium methoxide in methanol, carried out at room temperature over a period of 5–10 minutes, affords the thioether which is the monoalkylation product. Alkylation of the same mercaptan with a large excess of dimethyl sulfate or of diethyl sulfate in aqueous-alcoholic sodium hydroxide solution over a period of 45 minutes, however, affords the dialkylation product, in which both sulfur and oxygen have been alkylated.

Upon further alkylation of the thioethers, as by heating them with an alkyl halide in the absence of a basic catalyst, sulfonium salts of increased water-solubility are obtained. Such sulfonium salts have the structural formula

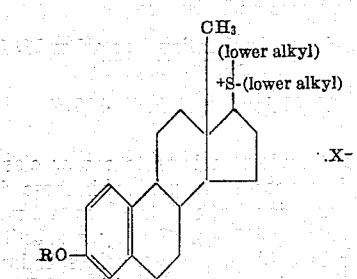

wherein R is defined as hereinbefore and X is a halide ion or equivalent non-toxic anion. It will be apparent that the lower alkyl groups attached to the sulfur atom of the sulfonium salts are equivalently bonded to the sulfur atom, regardless of the convention by which the compounds are named. For example, a typical sulfonium salt of this invention can be named as 3-ethoxy-17β - ethylthio - 1,3,5(10) - estratriene methobromide or alternatively as 3-ethoxy-17β-methylthio-1,3,5(10)-estratriene ethobromide.

Upon treatment of the 17-thiones of this invention with alkylating and acylating reagents, derivatives are formed which are structurally related to the thioenolic forms. Such compounds have the annular unsaturation of 1,3,5(10),16-estratetraene, and can be represented by the structural formula

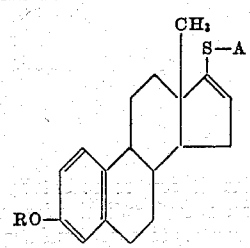

wherein R is defined as hereinbefore and A can represent a lower alkyl radical or an acyl radical.

Mixed ethers and esters within the scope of this invention can be prepared by suitable modifications of the procedures described herein. For example, estrone methyl ether is reacted with a large excess of hydrogen sulfide and hydrogen chloride to obtain 3-methoxy-1,3,5(10)-estratriene-17-thione. Reduction of this compound with sodium borohydride yields 3-methoxy-1,3,5(10)-estratriene-17β-thiol, which is converted to 3-methoxy-17β-acetylthio-1,3,5(10)-estratriene upon treatment with acetic anhydride in pyridine solution.

The compounds of this invention have valuable pharmacological properties. Specifically, they are estrogenic and anabolic agents. They are also useful in the treatment of degenerative diseases associated with abnormal cholesterol metabolism, as they reduce the serum concentration of cholesterol and the serum ratio of cholesterol to phospholipids. These compounds also exhibit a selective and useful enhancement of other pharmacological properties commonly associated with estrogenic hormones. In particular, they resemble diethylstilbesterol and other estrogens in producing an increase in bone density, and it is noteworthy that this proliferation of new bone tissue, a process opposite to that which occurs in natural aging, is achieved by these thiosteroids without a fully proportionate estrogenic response. The sulfonium salts of this invention are anti-bacterial and anti-viral agents, being, for example, effective in inhibiting the multiplication of influenza virus.

This invention will appear more fully from the examples which follow. These examples are set forth by way of illustration only, and it will be understood that the invention is not to be construed as limited in spirit or in scope by the details contained therein, as many modifications in materials and methods will be apparent from this disclosure to those skilled in the art. In these examples temperatures are given in degrees centigrade (° C.) and quantities of materials in parts by weight.

*Example 1*

A solution prepared from 9.7 parts of esterone acetate, 8.2 parts of benzyl mercaptan, 37 parts of acetic acid and 1 part of p-toluenesulfonic acid monohydrate is allowed to stand at about 25° C. for 20 hours. Sodium acetate (3 parts) and ice (100 parts) are added, causing the precipitation of an oily product. The suspension is made slightly basic with sodium carbonate and extracted with several portions of ether. The combined ether extract is washed with water, dried over sodium sulfate and filtered. The residue obtained by concentration of the filtrate is dissolved in benzene and poured on a chromatography column prepared from 190 parts of silica. Elution of the column with benzene and then with a 10 volume percent solution of ethyl acetate in benzene affords first a small amount of benzyl mercaptan. Further elution with a 10 volume percent solution of ethyl acetate in benzene affords an odorless, viscous oil which is the crude dibenzylmercaptole of estrone acetate. This compound has the structural formula

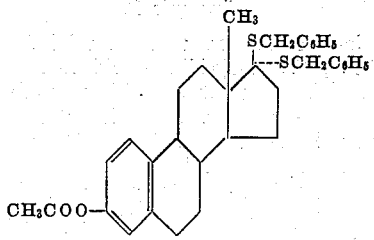

*Example 2*

A solution of 11.3 parts of the crude dibenzylmercaptole of estrone acetate in 35 parts of ether is slowly added to a solution of 20 parts of sodium in 330 parts of liquid ammonia. The reaction mixture is stirred for 2 hours, after which time an additional 280 parts of ether is added. There is then cautiously added 120 parts of ethanol followed by (after reaction of the sodium is complete) 300 parts of water. The reaction mixture is extracted with ether and this ethereal extract, which contains dibenzyl, is dicarded. The aqueous solution or suspension is made acidic by the addition of ammonium chloride and extracted with ether. The residue obtained by concentration of this ethereal extract is crystallized from a mixture of benzene and petroleum ether to afford yellow crystals of 3-hydroxy-1,3,5(10)-estratriene-17-thione. After further purification by recrystallization from benzene, this compound melts at about 212–213° C. It gives a pink solution in benzene. This compound has the structural formula

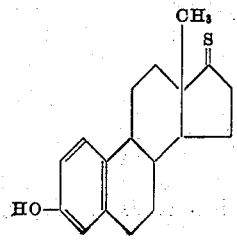

*Example 3*

Twenty-five parts of crude 3-hydroxy-1,3,5(10)-estratriene-17-thione is dissolved in a solution of 50 parts of sodium borohydride in 400 parts of methanol. After 15 minutes the reaction mixture is stirred with 2000 parts of water and 105 parts of acetic acid and is extracted with ether. The ethereal extract is washed with water and concentrated to dryness. Crystallization of the residue from a mixture of 160 parts of methanol and 300 parts of water affords about 11 parts of a crude solid product. This is extracted with about 4500 parts of benzene and the benzene solution is concentrated, diluted with petroleum ether and poured on a silica gel chromatography column. Crystalline fractions obtained by elution of the chromatography column with benzene and melting at about 190° C. or higher are further purified by recrystallization from a mixture of ether and petroleum ether to afford 3-hydroxy-1,3,5(10)-estratriene-17β-thiol melting at about 194–196° C. This compound has the structural formula

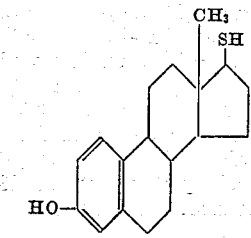

*Example 4*

A solution of 4 parts of the 3-monoacetate of estradiol, 4 parts of p-toluenesulfonyl chloride and 25 parts of pyridine is maintained at 65° C. for 16 hours and is then cooled to about 25° C. The mixture, which now contains precipitated pyridine hydrochloride, is poured into 500 parts of water. When crystallization of the initially-oily product is complete, it is collected on a filter and washed with water. Recrystallization from aqueous dioxane affords the mixed ester, 3-acetoxy-17β-(p-toluenesulfonoxy)-1,3,5(10)-estratriene melting at about 168–170° C.

*Example 5*

A solution of 5.2 parts of 3-acetoxy-17β-(p-toluenesulfonoxy)-1,3,5(10)-estratriene in 50 parts of dioxane is mixed with a solution of 4 parts of sodium hydroxide, 4 parts of water and 16 parts of methanol. This reaction mixture is allowed to stand at about 25° C. for 2 hours and is then diluted with 200 parts of water and acidified with acetic acid. When crystallization of the product is complete, it is collected on a filter and washed with water. This compound is 17β-(p-toluenesulfonoxy)-1,3,-5-(10)-estratrien-3-ol. The crude product obtained in this manner melts at about 180° C. and is satisfactory for use without further purification. The purified compound, obtained by crystallizations from mixtures of ethyl acetate and cyclohexane, melts at about 186–187° C. The structural formula is

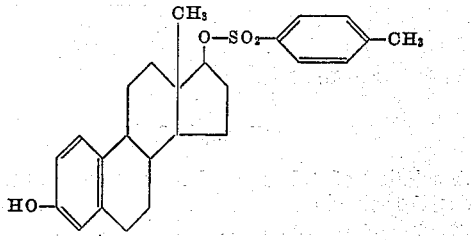

*Example 6*

A solution of sodium hydrosulfide is prepared by passing a stream of hydrogen sulfide gas through a mixture of 110 parts of ethylene glycol monoethyl ether and 7.5 parts of sodium methoxide, until substantially all of the sodium methoxide is consumed, as evidenced by the completion of the exothermic reaction. About 1 hour is a convenient period of time for this reaction.

This solution of sodium hydrosulfide is mixed with 4.2 parts of 17β - (p - toluenesulfonoxy)-1,3,5(10)-estratrien-3-ol and heated under reflux for 3 hours. The reaction mixture is then poured into 600 parts of water, acidified with 18 parts of concentrated hydrochloric acid and extracted with several portions of a mixture of ether and benzene. The combined organic extract is washed with water and concentrated to dryness. A solution of the residue in benzene is poured on a chromatography column prepared from 100 parts of silica. An oily product (about 1.6 parts) obtained by elution of the column with a 5 volume percent solution of ethyl acetate in benzene is dissolved in 210 parts of ether, and the ethereal solution is extracted with a total of 1000 parts of 5% sodium hydroxide solution, in several portions. The aqueous, alkaline extract is acidified with dilute hydrochloric acid and extracted with several portions of ether. This combined ethereal extract is washed with water and concentrated to dryness. The oily residue obtained in this manner is crystallized from a mixture of ether and petroleum ether. Further purification by repeated recrystallization from mixtures of benzene and petroleum ether or by a second chromatographic fractionation on a silica gel column affords purified 3-hydroxy-1,3,5(10)-estratriene-17α-thiol melting at about 135–136.5° C. This compound has the structural formula

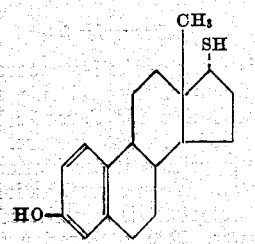

*Example 7*

A mixture of 2 parts of 3-hydroxy-1,3,5(10)-estratriene-17α-thiol, 30 parts of pyridine and 10 parts of propionic anhydride is maintained, with occasional stirring, for 24 hours at about 25° C. With external cooling, unreacted propionic anhydride is hydrolyzed by the addition of water, following which the mixture is diluted gradually with a large volume of water in order to precipitate the insoluble reaction product. This product is collected and washed with water. It is crude 3-propionoxy-17α-propionylthio-1,3,5(10)-estratriene which has the structural formula

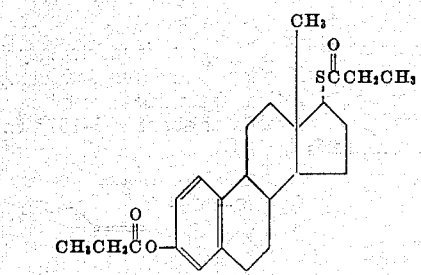

*Example 8*

A solution of 1.5 parts of 3-hydroxy-1,3,5(10)-estratriene-17β-thiol in 30 parts of warm pyridine is cooled to room temperature and treated with 2.5 parts of β-cyclopentanepropionyl chloride. The mixture is maintained at about 25° C. for 48 hours, after which it is slowly diluted with several times its volume of water. The insoluble product is collected and washed with water. It is crude 3 - cyclopentanepropionoxy - 17β - cyclopentanepropionylthio-1,3,5(10)-estratriene of the structural formula

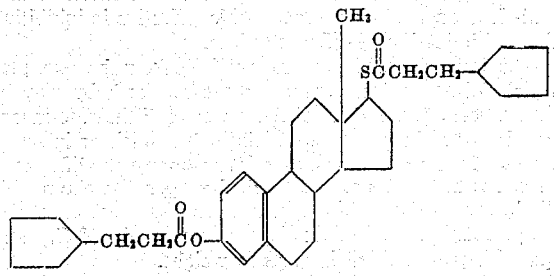

*Example 9*

A solution of 7.5 parts of 3-hydroxy-1,3,5(10)-estratriene-17β-thiol in 700 parts of 5% sodium hydroxide solution is treated with 35 parts of benzoyl chloride, and the mixture is stirred for 3 minutes. The insoluble product is collected on a filter, washed with water, dried, and purified by recrystallization from acetone. The compound thus obtained is 3-benzoyloxy-17β-benzoylthio-1,3,5(10)-estratriene which melts at about 209–210° C. and has the structural formula

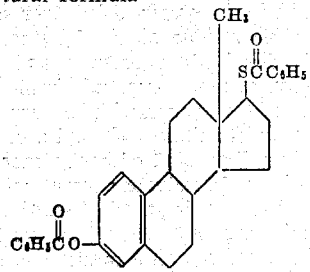

*Example 10*

A solution of 19.5 parts of estradiol 3-monomethyl ether in 250 parts of pyridine is chilled to about 5° C. and treated with 30 parts of methanesulfonyl chloride. The solution is allowed to stand without further cooling, and after one hour it is poured into 1200 parts of water, with stirring. The crystalline product is collected on a filter. When it is purified by recrystallization from aqueous acetone, it melts at about 174–176° C. This compound is 3-methoxy-17β-methanesulfonoxy-1,3,5(10)-estratriene of the structural formula

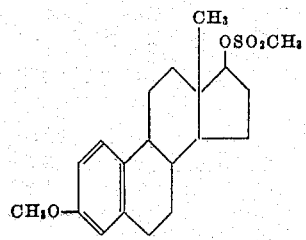

*Example 11*

A solution of sodium hydrosulfide is prepared by passing a stream of hydrogen sulfide gas through a mixture of 550 parts of ethylene glycol monoethyl ether and 50 parts of sodium methoxide, until substantially all of the sodium methoxide is consumed, as evidenced by the completion of the exothermic reaction. About 1 hour is a convenient period of time for this reaction.

To this solution is added 20 parts of 3-methoxy-17β-methanesulfonoxy-1,3,5(10)-estratriene, and the mixture is heated under reflux for three hours. It is then poured into 2000 parts of water, and the resulting mixture is acidified with 110 parts of concentrated hydrochloric acid, and extracted with a total of 900 parts of ethyl acetate in 3 portions. The ethyl acetate solution is washed successively with water, with sodium bicarbonate solution, and with saturated sodium chloride solution, following which it is rendered anhydrous, filtered, and distilled to dryness. A solution of the residue in the minimum quantity of a 20 volume percent solution of benzene in petroleum ether is poured onto a chromatography column prepared from 400 parts of silica, and the column is eluted with further quantities of the same solvent mixture, followed by mixtures of benzene and petroleum ether containing gradually increasing proportions of benzene. The desired compound, corresponding to a weight peak in the elution curve, is eluted at a satisfactory rate with a 50 volume percent solution of benzene in petroleum ether. Upon crystallizations from aqueous methanol and from aqueous ethanol these eluate residues afford 3-methoxy-1,3,5(10)-estratriene-17α-thiol melting at about 77–82° C. This compound has a specific rotation of about +31.3° in chloroform solution, and the structural formula

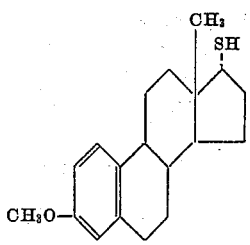

*Example 12*

To a stirred solution of 12.2 parts of 3-hydroxy-1,3,5-(10)-estratriene-17β-thiol and 4.82 parts of sodium methoxide in 240 parts of methanol is added over a period of 5–10 minutes a solution of 6.64 parts of methyl iodide in 40 parts of methanol. The temperature is maintained in the range of about 25–35° C. during the period of addition and for about 5 minutes thereafter, following which 1300 parts of water and 21 parts of acetic acid are added. The precipitated product is collected on a filter and washed with water. Upon recrystallization from benzene there is obtained 17β-methylthio-1,3,5(10)-estratrien-3-ol melting at about 143° C. This compound has a specific rotation of about +61.7° in chloroform solution and the structural formula

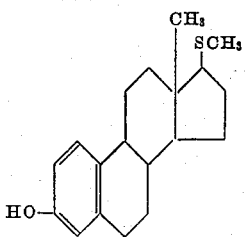

*Example 13*

To a stirred solution of 1.5 parts of 3-hydroxy-1,3,-5(10)-estratriene-17β-thiol in 80 parts of ethanol is added 5 parts of 10% sodium hydroxide solution and 2.4 parts of diethyl sulfate. Stirring is continued for a reaction period of 45 minutes. As the reaction proceeds, water is gradually added to the mixture so that a total of 300 parts of water is added during the 45 minute period. In addition, 10 parts of 10% sodium hydroxide solution and 4.8 parts of diethyl sulfate are added in several portions during the reaction period. The mixture is then extracted with ether, and the separated ethereal extract is washed with water and concentrated to dryness. The oily residue is crystallized from aqueous ethanol, following which it is dissolved in the minimum quantity of acetone. Water (250 parts) is added, and the mixture is extracted with petroleum ether. The separated petroleum ether extract is washed with 4 portions of dilute sodium hydroxide solution, rendered anhydrous, and distilled to dryness. By crystallization of the non-volatile residue from aqueous methanol there is obtained 3-ethoxy-17β-ethylthio-1,3,5(10)-estratriene melting at about 44–46° C. This compound has the structural formula

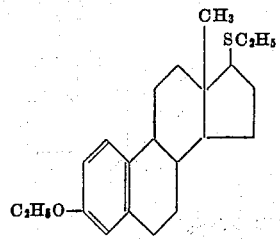

*Example 14*

A solution of 1.55 parts of 17β-methylthio-1,3,5(10)-estratrien-3-ol in 40 parts of methanol and 50 parts of methyl iodide is heated under reflux for 1 hour. The cooled reaction mixture is diluted with 70 parts of anhydrous ether, and the insoluble product is collected on a filter. Upon recrystallization from water there is obtained 17β-methylthio-1,3,5(10)-estratrien-3-ol methiodide which melts at about 180–184° C. and has the structural formula

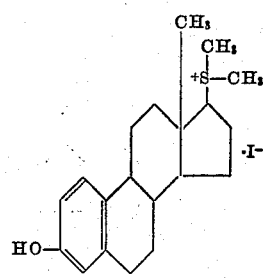

By the foregoing procedure, with the substitution of 1.55 parts of 17α-methylthio-1,3,5(10)-estratrien-3-ol for the corresponding 17β-isomer, the compound obtained is 17α-methylthio-1,3,5(10)-estratrien-3-ol methiodide.

*Example 15*

A chilled solution of 2 parts of 3-ethoxy-17β-ethylthio-1,3,5(10)-estratriene in 16 parts of methanol is treated with 17 parts of methyl bromide. The mixture is heated in a sealed reaction vessel, capable of withstanding considerable pressures, at about 60° C. for 4 hours. The mixture is then cooled and diluted with several times its volume of ether. The insoluble product is collected and washed with ether. It is the crude, relatively water-soluble 3-ethoxy-17β-ethylthio-1,3,5(10) - estratriene methobromide of the structural formula

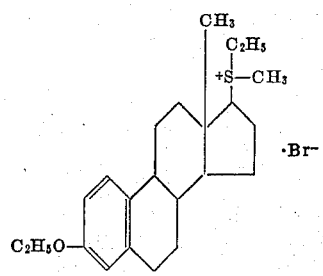

*Example 16*

A reaction mixture prepared from 1.6 parts of 3-hydroxy-1,3,5(10)-estratriene-17-thione, 25 parts of pyridine and 25 parts of acetic anhydride is maintained, with occasional stirring, for 20 hours at about 25° C. The solution is then poured into several times its volume of water, and the insoluble product is collected and purified by crystallizations from mixtures of benzene and petroleum ether. The compound obtained is 3-acetoxy-17-acetylthio-1,3,5(10),16-estratetraene which melts at about 137–139° C. and has a specific rotation of about +36.6° in chloroform solution. The structural formula is

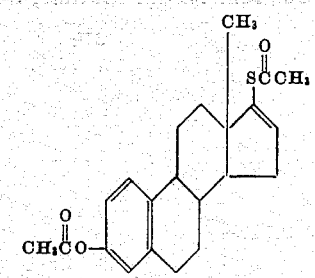

Example 17

3 - hydroxy - 1,3,5(10) - estratriene - 17 - thione (2.7 parts) is dissolved in a solution of 1.1 parts of sodium methoxide in 80 parts of methanol. Methyl iodide (2.9 parts) is added, and after 5 minutes of reaction time the mixture is diluted with 200 parts of water. Upon the addition of 10 parts of acetic acid, a heavy precipitate separates. This insoluble product is collected on a filter and purified by crystallizations from mixtures of acetone and petroleum ether. This compound is 17-methylthio-1,3,5(10),16-estratetraen-3-ol which melts at about 142–143° C. and has a specific rotation of about +85.7° in chloroform solution. The structural formula is

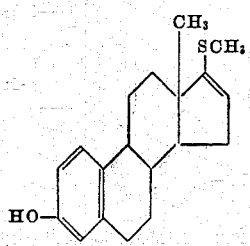

When a solution of 3 parts of this compound in 160 parts of methanol is treated over a period of 20 minutes with a total of 20 parts of a 10% sodium hydroxide solution and a total of 5 parts of dimethyl sulfate, added alternately and in divided portions, and the reaction mixture is diluted with several times its volume of water, the insoluble product formed is 3 - methoxy - 17 - methylthio-1,3,5(10),16-estratetraene. For purification, a solution of this product in petroleum ether is washed with several portions of dilute sodium hydroxide solution and with water, following which it is rendered anhydrous and concentrated to a small volume for crystallization.

Example 18

A stirred solution of 14 parts of estrone in 830 parts of purified dioxane and 320 parts of anhydrous ethanol, maintained at about 0–10° C., is treated simultaneously with a rapid stream of hydrogen sulfide and a rapid stream of hydrogen chloride until the solution is almost saturated with both of these compounds. It is satisfactory to carry out this operation over a period of about two hours. Stirring is continued for four hours thereafter, following which the reaction mixture is distilled to dryness under reduced pressure. The non-volatile residue is purified by crystallizations from mixtures of benzene and petroleum ether to afford 3-hydroxy-1,3,5(10)-estratriene-17-thione, identical with the product of Example 2.

What is claimed is:

1. A member of the class consisting of compounds of the structural formula

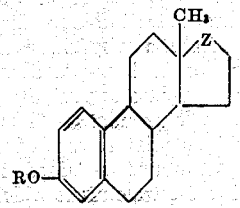

wherein R is a member of the class consisting of hydrogen, lower alkyl radicals, and acyl radicals of hydrocarbon carboxylic acids having fewer than 9 carbon atoms, and Z is a member of the class consisting of CS, CHSH, CHS(lower alkyl), CHS (lower alkyl)$_2$ halide, and CHS-acyl groups, the said acyl radical being the acyl radical of a hydrocarbon carboxylic acid having fewer than 9 carbon atoms; and compounds of the structural formula

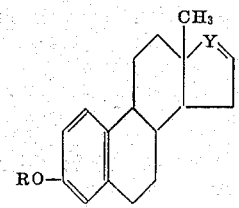

wherein R is defined as hereinbefore and Y is a member of the class consisting of CS(lower alkyl) and CS-acyl groups, the said acyl radical being the acyl radical of a hydrocarbon carboxylic acid having fewer than 9 carbon atoms.

2. 3-hydroxy-1,3,5(10)-estratriene-17-thione.
3. A compound of the structural formula

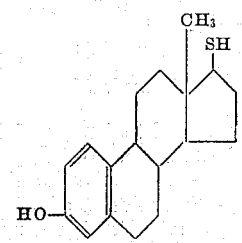

4. 3-hydroxy-1,3,5(10)-estratriene-17β-thiol.
5. 3-hydroxy-1,3,5(10)-estratriene-17α-thiol.
6. A compound of the structural formula

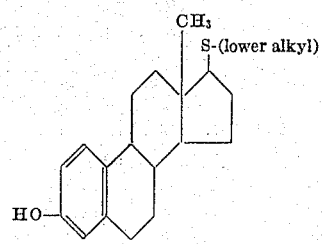

7. A compound of the structural formula

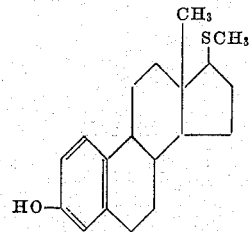

8. 17β-methylthio-1,3,5(10)-estratrien-3-ol.
9. A compound of the structural formula

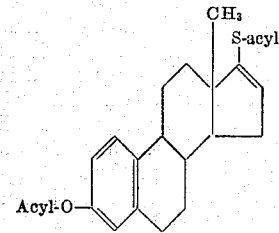

wherein the acyl radicals are acyl radicals of hydrocarbon carboxylic acids having fewer than 9 carbon atoms.

10. 3-acetoxy-17-acetylthio-1,3,5(10),16-estratetraene.

No references cited.